Aug. 3, 1965   G. H. MANUEL   3,198,259
POTATO DIGGING AND SEPARATING APPARATUS
Filed June 13, 1963   6 Sheets-Sheet 1
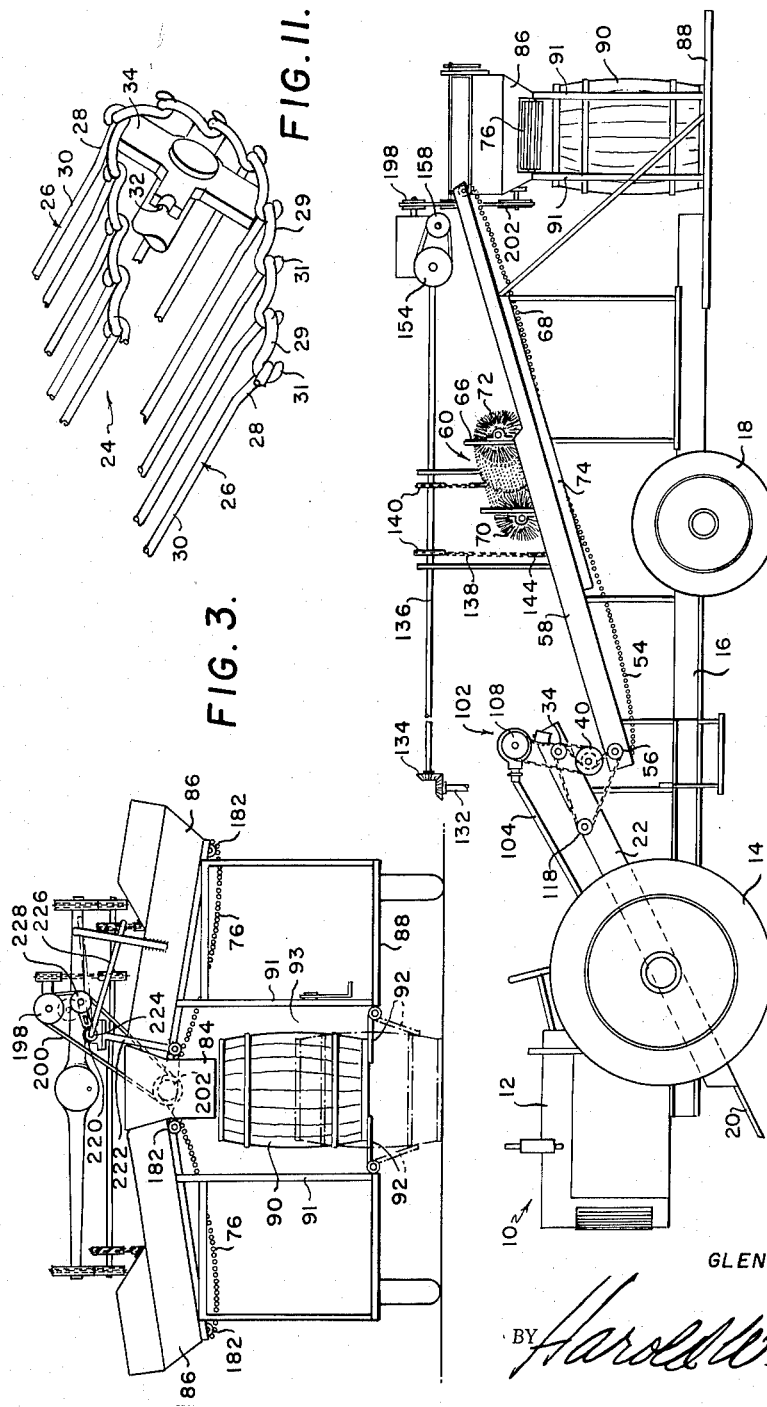
INVENTOR
GLENN H. MANUEL
BY
ATTORNEY

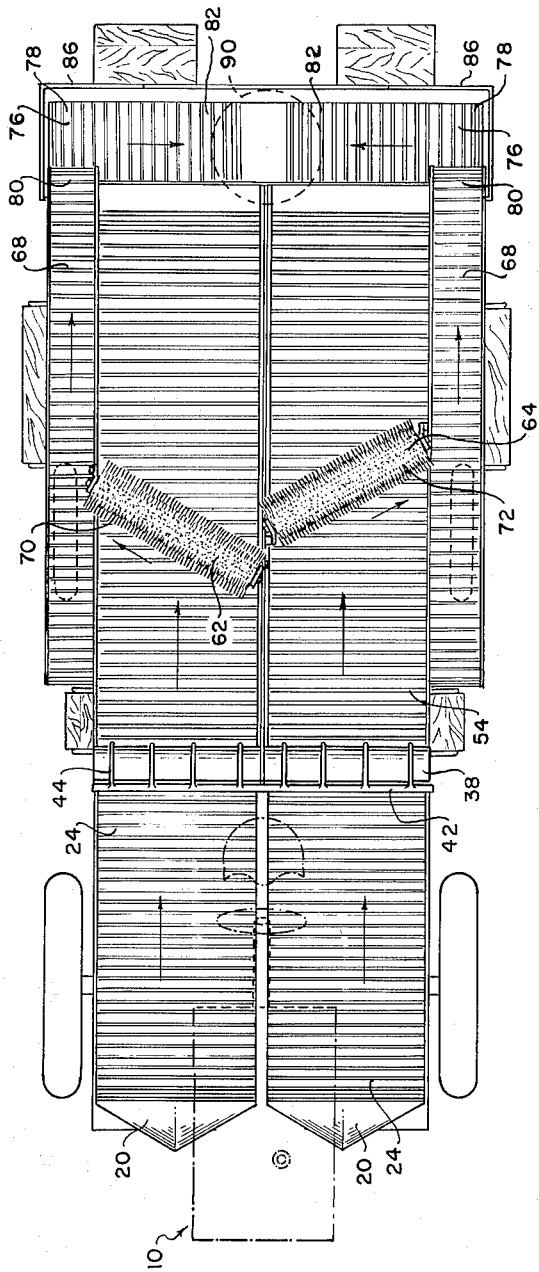

INVENTOR
GLENN H. MANUEL

Aug. 3, 1965 G. H. MANUEL 3,198,259
POTATO DIGGING AND SEPARATING APPARATUS
Filed June 13, 1963 6 Sheets-Sheet 4
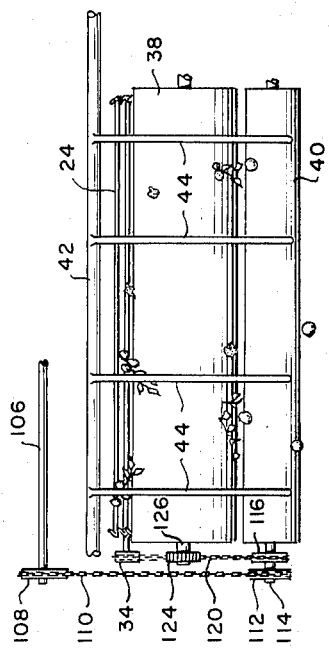
FIG. 6.
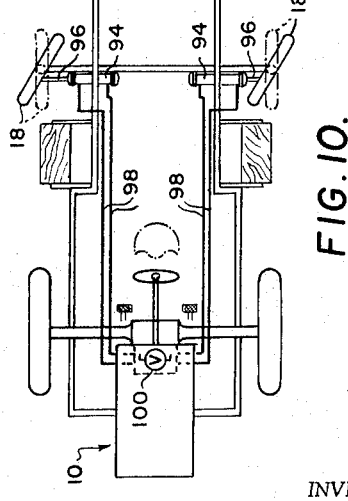
FIG. 7.
FIG. 10.
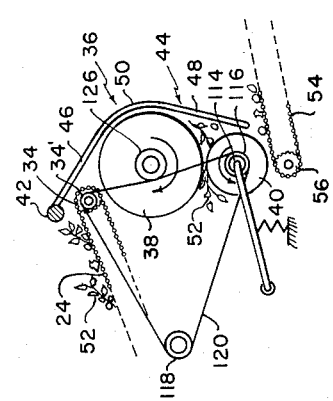
FIG. 5.
INVENTOR
GLENN H. MANUEL
BY *Harold W. Adams*
ATTORNEY Aug. 3, 1965 G. H. MANUEL 3,198,259
POTATO DIGGING AND SEPARATING APPARATUS
Filed June 13, 1963 6 Sheets-Sheet 5

INVENTOR
GLENN H. MANUEL

BY *Harold W. Adams*
ATTORNEY 3,198,259
POTATO DIGGING AND SEPARATING
APPARATUS
Glenn H. Manuel, R.F.D. 1, Monticello, Maine
Filed June 13, 1963, Ser. No. 287,574
17 Claims. (Cl. 171—28)

The present invention relates to a harvesting apparatus or device and more particularly to a harvesting device for root crops and the like, such as a potato digger.

Many attempts have been made to develop a machine for efficiently harvesting potatoes, beets and other root crops, without damaging the crop harvested and with a minimum amount of labor involved. The problems of digging a root crop, such as potatoes, separating the potatoes from soil, vines and stones, while at the same time cleaning the potatoes, and the depositing them in containers—all without bruising, skinning, or otherwise damaging the potatoes during the many handling steps—are indeed formidable. And these difficulties are further compounded where such crops as potatoes and beets are grown in stony, rocky soil such as in the State of Maine, one of the greater potato producing states in the United States.

A reason for these further difficulties and disadvantages is that existing harvesters generally do not and cannot quickly and efficiently dig and separate potatoes from stones and other refuse without additional manual labor and even begin to approach a production rate of 100 bushels of potatoes an hour. Although, as stated, many harvesting machines have been designed to dig and separate potatoes and other root crops from stones, such as those described in U.S. Patent 2,656,921, which issued to Gray on October 27, 1953, and U.S. Patent 2,657,798, which issued to Young on November 3, 1953, neither these machines nor any others to the inventor's knowledge, satisfactorily dig and separate potatoes quickly and efficiently with a minimum of cost.

A principal disadvantage with present-day potato harvesters as typified by the machines described in the noted U.S. Patents, aside from the fact that they are relatively slow and inefficient and require additional laborers to operate them, is the overall design of such machines. These machines require numerous conveyors, that run up, down, sideways, and backwards in order to dig and separate potatoes from stones. Obviously, in making all these turns, reversals, and changes in direction in manipulating the potatoes, the potatoes are subject to bruising, skinning and other damage. What's more, where such machines are operated in stony soil, they not only have been found to be relatively slow and inefficient, but subject to repeated breakdowns, as the stones hang up in the many sprockets and belts forming the elaborate conveyor system. This in turn requires the use of such devices as shear pins, and other throwout devices to prevent extensive damage to the machine upon jamming caused by the stones and other refuse. Further, although known machines employ brush or flail type devices for separating potatoes from stones, these machines, to the inventor's knowledge, have not found widespread acceptance because of the bruises and other damage to the potatoes resulting from the separation of the potatoes from stones, as well as relatively inefficient separation and lower production rate.

Also, present day harvesting machines generally have large turn radii and are disadvantageous to the producer who raises and harvests his crops on relatively small fields or in other terrain requiring short turns and who desires to plant his crops right to the edges of his fields and thus fully utilize the land.

Accordingly, it is an object of the present invention to provide an agricultural implement or device comprising a machine for picking and harvesting clean root crops such as potatoes and the like, which is so constructed and arranged as to dig, clean and separate the potatoes from their vines, soil, stones and other refuse, in a substantially straight in-line operation and in a gentle manner, so as not to bruise or damage them and then deposit the potatoes in suitable containers.

Another object of the present invention is to provide an in-line, self-propelled or drawn type potato harvesting machine having a relatively small turning radius for use in small fields and other localities where short turns are required to efficiently harvest the crop.

A further object of the present invention is to provide a potato harvester that may be either self-propelled or drawn having a relatively small turning radius, being provided with turning means associated with the rear wheels of the harvester so as to further shorten or decrease the turning radius of the harvester so that it can be used in relatively small fields.

Yet another object of the present invention is to provide a ptotato harvester that is self-propelled and provides an in-line potato picker, with the potato picking structure and the conveyor means embodied therein all being disposed substantially in straight alignment with the path of travel of the wheels of the vehicle.

Another object of the present invention is to provide a self-propelled in-line potato picker with rear wheel steering whereby the vehicle is not only highly maneuverable but the potatoes are dug, stripped from the vines, and separated from stones and the like, all in a substantially straight-line operation.

Still another object of the present invention is to provide a potato digger device with vine-stripping roller means for stripping the potatoes from the vines and discarding the vines directly below the machine. In this arrangement, the potatoes, soil, stones and vines are conveyed directly from the diggers over the stacked vine pulling roller means with the roller means being disposed in a vertical arrangement so that no stones will inadvertently be pulled between the roller means to cause damage to them.

A further object of the present invention is to provide vine-stripping roller means for stripping the vines from the potatoes wherein the vines pass under flexible arm means that curve downwardly over the vine-stripping roller means and tend to urge the vines into the roller means while permitting the stones and potatoes to fall free onto conveyor means disposed directly below the vine-stripping roller means.

Another object of the present invention is to provide a potato harvesting machine provided with two separate sets or pairs of diggers, conveyors, vine-stripping roller means, brush separating means, and loading conveyor means that are disposed in a parallel side-by-side relationship.

Another object of the present invention is to provide a potato harvester with transversely extending loading conveyor means that are operated simultaneously to fill a container with potatoes.

Another object of the present invention is to provide a potato harvester machine with cross or transverse type conveyor loading means that have storage means associated therewith so that while the harvester is continuously operating to dig potatoes and to separate the vines, stones and dirt from the potatoes, the cross or transverse conveyor loading means can be disengaged from operation with the rest of the machine in order to remove a loaded container and replace it with another container for filling with the potatoes.

Another object of the present invention is to provide a potato digger machine having bowed or curved conveyor rollers or link or bar means to enhance the separation of the stones from the potatoes that are carried thereon.

Another object of the present invention is to provide a potato harvester machine having angularly disposed brush means for separating the potatoes from stones, and in which a plurality of angular brush means can be disposed on the machine at different stations.

Another object of the present invention is to provide a potato harvester machine with rotatable brush means for separating potatoes from the stones by casting or throwing the less dense potatoes from one conveyor to another conveyor means which brush means can be disposed in pairs on the device, and a series of pairs of brushes can be used having different rotational velocities.

Still a further object of the invention is to provide a potato harvester machine having drive means for driving the rear centrally disposed conveyor means, the potato conveyor means disposed outwardly of and extending longitudinally of the central conveyor means, and the transverse potato loading conveyor means, and the rotating brush means, and other drive means for operating the vine-stripping roller means and the front longitudinally extending conveyor means.

Another object of the present invention is to provide means for lowering a loaded potato container from the device to the ground while the device is maintained in continuous operation, so that another empty container can be disposed on the device and loaded with potatoes dug during the time of replacing the loaded container.

Another object of the present invention is to provide means for shaking, vibrating or causing an undulating movement or motion in the conveyor means adjacent the brush separating means for rolling the potatoes on the conveyor means to increase the efficiency of separating them from the stones.

Various other objects and advantages of the present invention will be readily apparent from the following detailed description when considered in connection with the accompanying drawings forming a part thereof, and in which:

FIGURE 1 is a side elevational view of the potato harvesting device embodied in the present invention;

FIGURE 2 is a top plan view of the potato digger device illustrating the direction of movement of the conveyor means therein, with certain parts left out for purposes of clarity;

FIGURE 3 is a view of the potato digger device of the present invention looking at it from the rear;

FIGURE 5 is an enlarged side elevational detail view of the vine-stripping roller means embodied in the invention;

FIGURE 6 is a view of the vine-stripping roller means shown in FIGURE 5, looking at it from the rear;

FIGURE 7 is a detail view of the brush drive means and brush means and their relationship with respect to the central conveyors and side conveyors embodied in the present invention;

FIGURE 10 is a plan view of the device with certain parts omitted illustrating means for turning the rear wheels of the vehicle;

FIGURE 11 is a detail view of the conveyor means with the bars or links operatively connected to a sprocket member;

Figure 4:
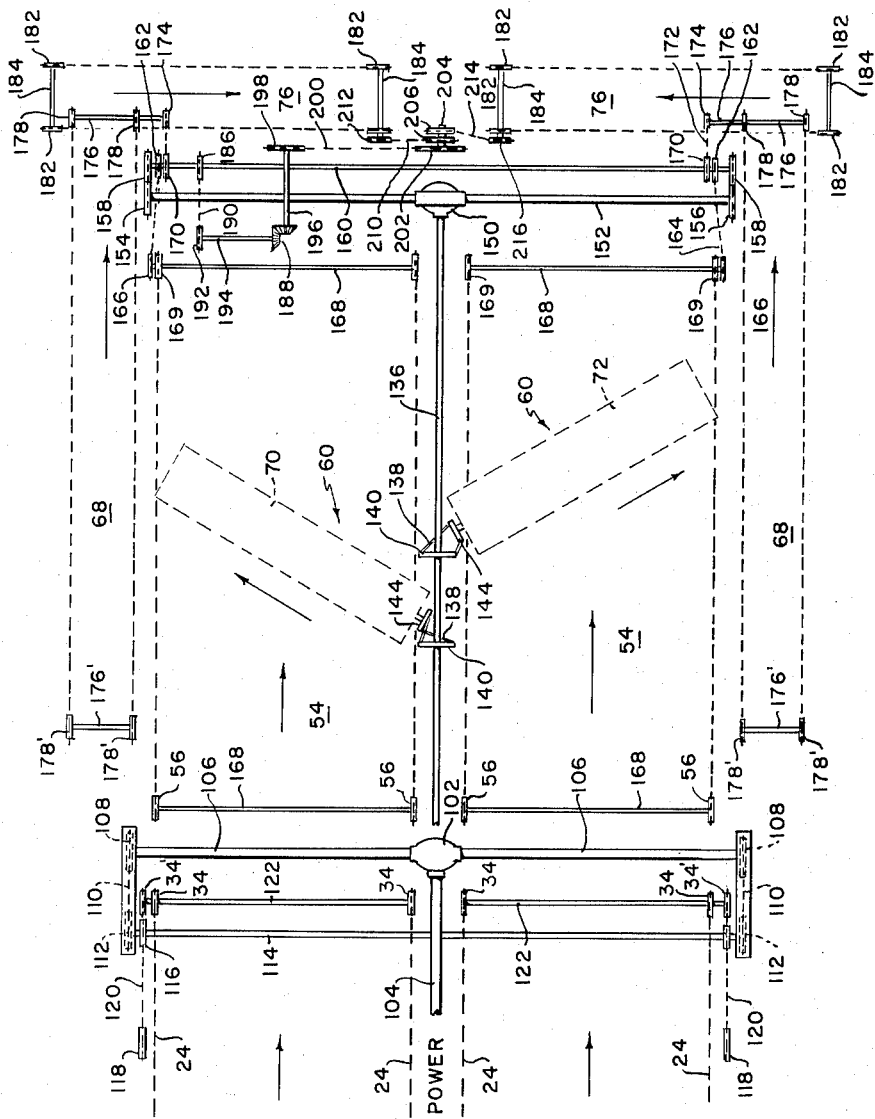
FIGURE 4 is a more or less diagrammatic view in plan, illustrating the drive connections of the various parts of the machine.

Referring to the drawings, the reference numeral 10 generally designates the self-propelled potato digger device or machine of the present invention provided with an engine 12 for propelling the vehicle or machine through the enlarged front wheel drive 14. The device is provided with a structural main frame or chassis 16 and has a set of rear wheels 18.

The front end or forward portion of the vehicle is provided with potato digger blades or plows 20, as best shown in FIGURES 1 and 2, for digging into the earth to plow up or uncover potatoes or similar root crops. The diggers 20 are connected to an inclined frame 22 which is rigidly secured by any suitable well-known means such as angle iron members and the like to the chassis 16 for supporting it thereon. The frame is also provided with any suitable means, not shown, such as a hydraulic jack for lowering the diggers 20 the desired distance in order to turn up or dig out potatoes buried in the earth.

Frame 22 also carries a pair of parallel disposed longitudinally extending endless conveyors 24 as best seen in FIGURE 2, which conveyors are disposed adjacent the rear portion of the digger blades or plows 20. Since the endless conveyors 24 are identical to each other, it will only be necessary to describe one. The conveyors 24 comprise a plurality of transversely extending spaced links, rods or bars 26, preferably covered adjacent their middle portion with rubber or plastic material so that they will not damage or bruise the potatoes that are carried thereon. FIGURE 11 clearly illustrates the plurality of links or rods 26 made of metal material which make up the endless conveyors. The links or rods 26 have an upwardly inclined portion 28 adjacent each side or end portion thereof with an elongated bowed or curved center portion 30 extending between the end portions 28 so as to form a hollow concavity or recess the full length of the conveyor. The extreme opposite ends 29 of the side portions 28 are bent forward at approximately a 90° angle and twisted as at 31 with a loop so as to interlock with the next adjacent or successive link or bar 26.

Referring to FIGURE 11, it will also be noted that the individual links are further designed to be readily carried in cut-outs or recesses 32 of sprocket members 34. The sprocket members 34 are disposed adjacent opposite ends of the conveyor 24. All of the endless conveyors hereinafter described in the specification are identical to the conveyor 24 and provided with the same links 26 and interlocking ends, and sprocket members 34.

The pair of conveyors 24 are upwardly inclined as best shown in FIGURE 1 so that these forward conveyors will carry potatoes, lumps of dirt and stones, and any other material that does not fall through the spaced individual links, upwardly and toward the rear of the potato digging machine. The links 26 are spaced any predetermined desired distance from one another, and are preferably spaced so that they will not permit any potatoes to fall between the links back to the terrain, but will readily permit dirt and small stones and the like to be deposited back on the terrain as the vehicle is driven along a path of travel to continuously dig up the potatoes from beneath the soil.

The upper rear end of the conveyors 24 are carried by sprocket members 34 as best shown in FIGURE 5, disposed adjacent and above vine-stripping means 36 so that the potatoes, stones and any other debris are deposited or fall onto the upper surface of the upper roller 38 of the vine-stripping means. The vine-stripping means is also provided with a lower roller 40 of smaller diameter than the upper roller and disposed vertically therebeneath. A transversely extending bar 42 as best shown in FIGURES 5 and 6 is conencted to the frame of the vehicle by any suitable means and has a plurality of rearwardly extending flexible bars 44 for causing the vines of the potatoes to become snagged or entangled therein in order to pull the vines from the potatoes as they pass by the vine-stripping means. The flexible bars or rods 44 are substantially vertically disposed and are spaced laterally of each other with each bar, as best shown in FIGURE 5, comprising a backwardly and downwardly extending portion 46, and a lower forwardly extending portion 48, with a bend 50 between these two portions. As the potatoes and dirt and stones are dropped off the rear of the conveyor 24, it is readily apparent that the only portion of this material that will be fed between the rollers are the vines 52 attached to the potatoes so that the vines will be pulled or ripped from the potatoes and the potatoes will freely fall onto the front end of two parallel conveyors 54. The vines 52 are pulled between the stripper rollers 38 and 40 and dropped forwardly of the stripper rollers and conveyors 54 to the ground. The two conveyors 54 will be referred to as the middle or central conveyors and extend substantially longitudinally of the path of travel of the potato digging machine and are disposed in substantially longitudinal alignment with the front or forward conveyors 24. The conveyors 54 are carried by sprocket members 56 identical to sprocket members 34, already described, and these conveyors 54 are identical in structure to the described conveyors 24.

Referring to FIGURE 1, the conveyors 54 are carried in a frame 58 properly secured to the chassis 16 by suitable structural members that are well known. The conveyors 54 are inclined in an upwardly direction as shown in FIGURE 1, and extend from a point substantially midway between the front and rear wheels 14 and 18 respectively, to a point substantially beyond the rear wheels 18. The front lower end of the conveyor 54 is disposed below and adjacent the lower smaller roller 40 of the vine-stripping means as best shown in FIGURE 5, so that the potatoes, stones and other debris, once the vines have been removed from the potatoes, fall onto the front end of the conveyor, and are carried in a rearward direction and upwardly toward the rotatable brush means generally designated 60, at which brush station the potatoes are separated from the stones, as hereinafter described.

The upper rear end of the conveyor 54 extends beyond the rear wheels 18 to a point substantially coextensive with the rear end of the chassis 16, and the upper rear end of the conveyor 50 is at a vertical height substantially higher than the height of the rear end of the front conveyor 24 as best shown in FIGURE 1.

Referring to FIGURE 2, it will be noted that the front or forward conveyors 24 and the middle or central conveyors 54 are both disposed in substantially straight alignment with the two vine-stripping means 36 so that all three of these elements or component parts of the potato digger device are in a straight line alignment, and give a straight line operation along the path of travel of the self-propelled machine. With such an arrangement it enables the dirt that is removed from the field being harvested to be replaced in a proper position so that there is no necessity for grading the terrain, as the case would be should the machine burrow or dig into the earth so as to plow up, say, approximately twelve inches of dirt and thereafter redeposit it in another section of the field.

The rotatable brush means 60 are angularly disposed across the width of the conveyors 54 as best seen in FIGURE 2 with the forward ends 62 of the brushes disposed forwardly of their rear ends 64. The brushes are angularly disposed with respect to the longitudinal axis of the conveyors 54 and the longitudinal axis of the chassis 16 so as to provide or form approximately a 45-degree angle therewith. Each brush is identical to the other brushes which are disposed in pairs opposite one another with one brush being provided for each conveyor 54. The brushes are rotatably suported in vertical supports 66, as shown in FIGURE 1, suitably attached to the frame 58 by any desired means. The brushes comprise a plurality of flexible radially extending bristles made of any desired material stiff enough to resist passage of the relatively light potatoes but of sufficient flexibility to pass the dense, heavy stones through the brush. The brushes 60 are rotated in the same direction as the conveyors 54 and in a direction to throw the potatoes passing in a rearward direction along the conveyors 54, laterally outwardly of the two conveyors 54 and onto two side conveyors 68. Any stones intermixed with the potatoes and passing through the brushes 60 are carried by the conveyors 54 to the end of the machine and dropped to the ground. The brushes 60 are disposed out of alignment with each other with one brush 70 being disposed slightly forward of the other brush 72 so that they can sweep the full width of the conveyors 54 and will not interfere with the operation of each other. A running board is provided on either side of the machine adjacent to conveyors 68 for operators to stand on while the machine is in operation.

The side conveyors 68 are of substantially the same structure as that already described in connection with the conveyors 24 and 54, except that the conveyors 68 are of substantially narrower width than the conveyors 54 as best shown in FIGURE 2. The conveyors 68 extend longitudinally of the vehicle or machine and parallel to the central axis of the vehicle and extend from a point substantially rearwardly of the leading edge or portion of the conveyors 54. The rear end of the conveyors 68 extends substantially beyond the rear end of the conveyors 54, as best seen in FIGURE 2. The conveyors 68 are disposed adjacent the outer side of each conveyor 56 and have substantially the same inclination or slope as the conveyors 54 and are in substantially the same plane of inclination as the conveyors 54 in order to receive thereon the potatoes kicked or thrown outwardly by the brushes 70 and 72. The outer sides of the conveyors 68 are provided with an upstanding side wall or frame 74 to prevent the potatoes from being thrown off of the machine. The opposite ends of conveyors 68 are carried by sprocket members 32 similar to the sprocket members shown in FIGURE 11.

The potatoes are carried upwardly on the conveyors 68 and discharged or dropped off the rear end thereof onto two loading conveyors 76 disposed across the rear end portion of the machine. The loading conveyors 76 extend transversely of the machine and have their outer ends 78 disposed vertically below the rear ends 80 of the conveyors 68. It will also be noted that the outer ends 78 of the conveyors 76 also overlap or extend forwardly of the rear ends 80 of the conveyors 68. The discharge or inner ends 82 of conveyors 76 are higher than the outer ends 78 so that the transverse loading conveyors 76 are sloped or inclined upwardly from their outer ends toward inner ends which are disposed at a point near the centerline of the vehicle or machine. The conveyors 76 are of substantially the same structure as the other conveyors, except that they are substantially wider than the conveyors 68 and substantially narrower than the conveyors 56. The inner ends 82 of these conveyors are disposed in spaced apart relationship with one another so as to provide suitably connected discharge chute 84 (see FIGURE 3) therebetween into which the potatoes are dumped. An upstanding side wall or side frame 86 is disposed around the perimeter of the conveyors 76 so that none of the potatoes will inadvertently fall off the conveyor. The side walls 86 are of substantial depth so that the conveyors 76 may be disconnected or disengaged from the remaining parts of the machine at certain desired periods so that the potatoes will stack on the discharge conveyors 76, as hereinafter described. The vehicle is provided with a rear platform 88 suitably secured to the rear of the chassis 16, upon which a container or barrel 90 is disposed for loading potatoes therein from the conveyors. The barrel 90 is disposed below the chute 86. A spring-loaded device 92 is suitably secured to the rear platform 88 below the discharge chute 86 and is adapted to receive a container 90 thereon.

Referring to FIGURES 3, 4, 12 and 13, a vertical frame consisting of two pairs of spaced vertical structural members 91 are suitably connected to the platform 88 adjacent opposite sides of the opening 93 below the chute 84. Two swingable plates 95 are fixed to shaft 97 journalled in lugs 99 fixed to platform 88. The support plates 95 are spaced from each other, but sufficiently close enough to each other to receive and support a container 90 thereon for filling it with potatoes. A heavy spring member 101 has one end fixed to a vertical member 91 on the right side of the platform, and its other end fixed to a short link 103, in turn fixed to shaft 97 on the left side of platform 88, as shown best in FIGURE 13. The link 103 is also pivotally connected by pin 105 to two elongated transverse parallel link members 107 having their opposite ends pivotally connected by a pin 109 to another link member 111 which is fixed to shaft 97 on the right side of the platform. The force in spring 101 normally pulls on link 103 so as to maintain support plates 95 in a horizontal position as shown in dotted lines in FIGURES 12 and 13.

Figure 12:
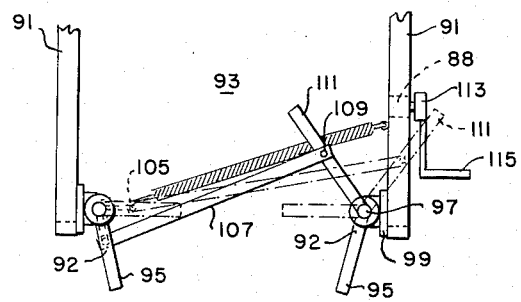
FIGURE 12 is an elevational detail view illustrating means for releasing a loaded potato container from the vehicle.
Figure 13:
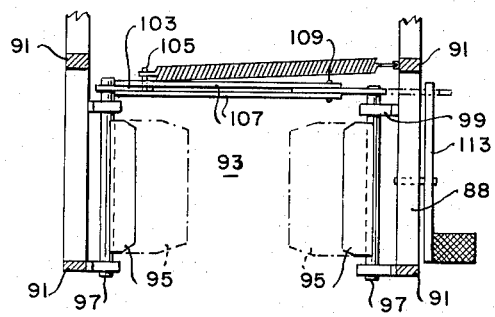
FIGURE 13 is a plan view of FIGURE 12.

At this time the upper end of link 111 extends to the right of the vertical members 91 on the right side of platform 88 as best seen in FIGURE 12. A release lever 113 extending longitudinally of the machine and provided with a foot pedal 115 is pivotally connected to the platform 88 by any suitable means to engage the portion of link 111, as shown in FIGURE 13 and latch the plates 95 in a horizontal position, until such time as the pedal 115 is depressed to swing release lever 113 upwardly and clear of link 111. The weight of the container 90 and the potatoes therein will then overcome the force in spring 101 and force the plates 95 downwardly to an opened position so that the filled container or barrel will be dropped to the ground.

Thereafter, when the barrel has been discharged from the platform an operator may place another empty container or barrel on the spring-loaded devices 92 for filling from the conveyors 76.

Referring to FIGURE 10, means are shown therein for turning the rear wheels 18 by a hydraulic system to shorten the turning radius of the potato picker. It will be noted that each wheel 18 is provided with a separate hydraulic cylinder 94 in which is disposed a piston connected to a piston rod 96 extending therefrom and suitably secured to the wheel frame by well known means for moving the wheel or turning it from the solid line position into the dotted line position shown in FIGURE 10. Each end of the hydraulic cylinder 94 is provided with a hydraulic supply line 98 in communication with an oil reservoir 100 through suitable valve means operated by the tractor operator so as to supply oil to one end of the cylinder 94 and to bleed oil from the other end of the cylinder so as to turn the wheels 18 to a desired position in order to shorten the turning radius of the vehicle. The oil is supplied under pressure to the cylinders by a well known oil pump, not shown, and operatively connected to the engine for actuation thereby by well known means.

Referring to FIGURE 4, the means for driving the conveyors embodied in the invention and the brush means is shown in a plan view therein. All the conveyor means and the brush means are operatively connected by well known means to the power take-off (not shown) of the tractor engine 12.

The front conveyors 24 and the vine-stripping rollers 38 and 40, as shown in FIGURES 4, 5 and 6, are driven through a front differential device 102 suitably secured to the chassis of the machine by any suitable means, and operatively connected to power take-off of the tractor engine by a take-off shaft 104. The opposite ends of the front differential device shaft 106 are provided with sprocket members 108 (see FIGURE 4) carrying a roller chain 110 (FIG. 4) which drives sprocket members 112 (FIG. 4) fixed to a shaft 114. Disposed inwardly of the sprocket members 112 are two sprocket members 116 (FIG. 4) on each side of the shaft 114. The sprocket members 116 are connected to an idler sprocket 118 (FIG. 4) and the front conveyor drive sprocket members 34' through roller chains 120 carried by the sprocket members 116, 118, and 34'. The sprocket drive members 34' are secured to a shaft 122 to which are secured the sprocket members 34 carrying the links 26 of the front conveyors 24. The front end of conveyors 24 are provided with sprockets similar to sprockets 34 which carry the links 26, and with shafts similar to shafts 122. The roller chains 120, as best shown in FIGURES 5, and 6, also engage the sprocket members 124 secured to the opposite end of a shaft 126 to which is fixed the upper vine-stripping roller 38. Sprockets 112 rotate the lower vine stripping rollers 40 which are secured to the shafts 114 for rotation therewith. Thus, the vine-stripping rollers are positioned to rotate in the direction of the arrows shown in FIGURE 5 and the conveyors 24 are also adapted to be drive along with the two vine-stripping rollers from the take-off shaft 104 through the front differential device 102.

The middle conveyors 54 and the side conveyors 68 and the discharge or transverse loading conveyors 76 as well as the brushes 70 and 72 are operatively connected to the power take-off of the tractor through a power take-off shaft 132 for operating the component parts of the potato digger. The power take-off shaft 132 is connected through bevel gears which mesh with each other to an elongated drive shaft 136 suitably secured to the frame of the vehicle and extending longitudinally of it, above the conveyors 54 as best seen in FIGURE 1.

As best shown in FIGURE 7 a belt drive is provided for rotating the brush 72 on the righthand side of the vehicle. The belt drive, as seen in FIGURE 7, which is a view looking at it from a forward end, comprises a V-belt 138 carried on a pulley 140 secured to the shaft 136, and a pulley 142, and another V-belt pulley 144 both suitably secured to the frame of the vehicle. The outer end of the brush 72 is suitably journalled by any well-known means, as shown in FIGURE 1, to a support carried by the vehicle frame. The pulley 140 drives the idler pulley 142 and the pulley 144 which is rotatably journalled by suitable means, not shown, which pulley 144 is fixed or secured to the universal joint and shaft 146 of the brush 72 so as to rotate it in a direction to cause the potatoes to be thrown outwardly from the conveyor 54 and onto the side conveyor 76. The other brush 70 is secured similarly to the frame of the chassis and the drive shaft 136 and is provided with similar pulleys, as already described in connection with the brush 72, except that the belt 148 for the brush 70 is twisted into a figure 8, as shown in FIGURE 4, so that the brush 70 will rotate in a direction opposite to the rotation of brush 72 to cause the potatoes being conveyed along the machine on the other or left side of conveyor 54 to be thrown outwardly in the opposite direction onto its respective side conveyor 68 adjacent thereto.

Figure 8:
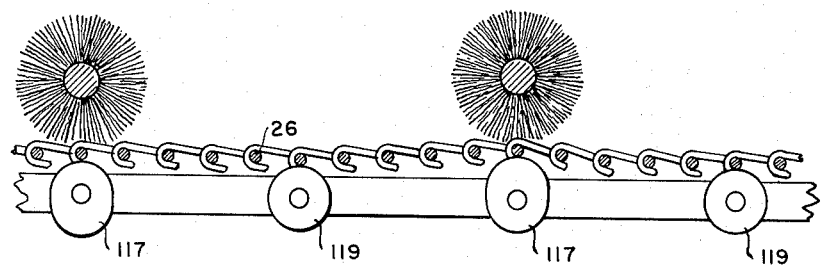
FIGURE 8 is a detail view illustrating the means for causing a shaking or undulating motion in the conveyor means adjacent the brush means.

Referring to FIGURE 8, the conveyors 54 adjacent the brushes 70 and 72, and just below the upper pass or section of the conveyors, are provided with eccentric rollers 117 connected to the frame by any suitable means to shake, vibrate or cause an undulating movement or motion of the conveyors as they pass the brushes. The upper section or pass of the conveyors is also provided with concentric or round rollers 119 suitably disposed as desired to support the conveyor between its drive sprocket members and to keep it from sagging in an inordinate amount. All of these rollers are freely rotatable.

The undulating motion moves the bed or upper section of conveyors 54 up and down about ½ to 1 inch as it passes the brushes and has a tendency to roll the potatoes, causing a better separation of them. The heavier stones are moved toward the center of the conveyors 54 by the undulations—also aiding in more efficient separation.

Figure 9:
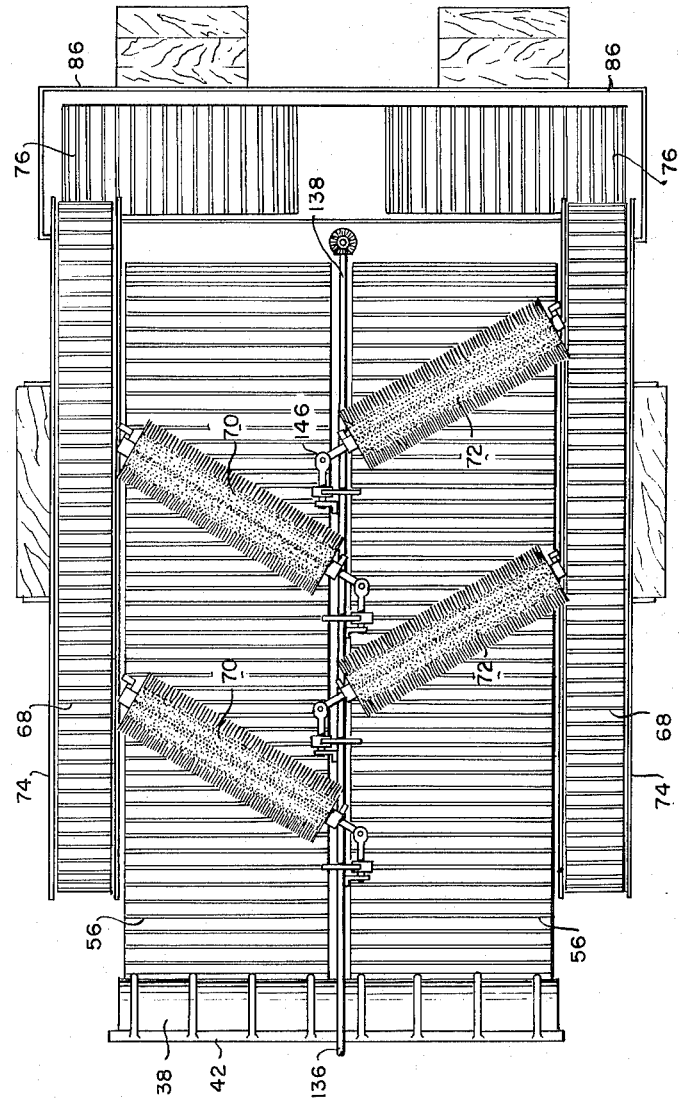
FIGURE 9 is a plan view of a portion of the conveyor means embodied in the present invention utilizing a plurality of spaced rotating brush means disposed in pairs along the longitudinal axis of the central conveyor means.

Referring to the embodiment shown in FIGURE 9, the conveyors 54 are provided with a plurality of brush sets 70 and 72 thereon. The brushes are properly supported on the frame in identical fashion to each other with the belt drive of brushes 70 being twisted and to rotate so as to throw the potatoes outwardly adjacent the side conveyor 68 which is adjacent thereto, as already described in connection with the single set of brushes. The provision of a multiple set series of brushes will enable any potatoes that have somehow passed under the brushes under heavy rock conditions to come into contact with the brush disposed rearwardly of the forward brush so that there will be another chance to insure that the potatoes are kicked off onto the side conveyors 68 and they will not be wasted.

The first or forward set of brushes will turn slower than the rearward or second set of brushes, and the first set will separate the big potatoes. The second brushes will be rotated faster by changing the size of the pulley drive, and they will be set lower, or near to the conveyor bed and will separate smaller potatoes.

Referring to FIGURE 4, the rear end of the drive shaft 136 is provided with a differential unit 150 having a shaft 152 with sprocket members 154 secured to the opposite ends thereof. The sprockets 154 carry roller chains 156 connected to sprocket members 158 carried on a transversely extending shaft 160. The shaft 160 is provided with sprocket members 162 adjacent the inner side of the sprocket members 158 which sprocket members 162 carry roller chains 164 secured to the sprocket members 166 secured to the outer ends of shafts 168. Shafts 168 in turn have sprockets 169 secured to links 26 of the conveyors 54 connected thereto for driving the conveyors 54 in the direction indicated by the arrows in FIGURE 4. The front end of the conveyors 54 are provided with identical shafts 168 and the sprocket members 54 identical to sprockets 169, also connected to the links 26 of the conveyors 54.

The side conveyors 68 are driven by shaft 160 through sprocket members 170 secured to the shafts 160 and roller chains 172 carried by sprockets 170 and connected to the sprocket members 174 on transverse shafts 176. The shafts 176 are provided with sprockets 178 on opposite ends thereof to which the links 26 of the conveyor 68 are connected. The front end of the conveyors 68 are provided with shafts 176' having sprocket members 178' also connected to the links 26 of the conveyor 68. The shafts of the conveyor are secured by any suitable means to the frame of the vehicle.

The transverse rear loading conveyors 76 have their links 26 connected to sprocket members 182 fixed to shafts 184 spaced at the opposite ends of the conveyors. These conveyors 76 are driven in opposite directions as indicated by the arrows shown in FIGURE 4, so as to feed the sorted potatoes inwardly toward the longitudinal axis of the machine, through a sprocket member 186 fixed to the shaft 160 and connected through bevel gears 188 through a roller chain 190 carried by the sprocket member 186 and another sprocket member 192 secured to the shaft 194. The output bevel gear 188 is fixed on a shaft 196 having a pulley member 198 carried by the pulley member 198. The opposite end of belt 200 is carried by a V-belt pulley 202. The V-belt pulley 202 is provided with a shaft 204 to which are secured two identical V-belt pulleys 206. One pulley 206 carries a twisted belt 210 connected to one of the rear conveyors 76 through a V-belt pulley member 212 secured to the inner shaft 184 of one conveyor 76. The other V-belt pulley 206 is connected by a straight belt 214 to the V-belt pulley 216 of the other inner shaft 184 of the other conveyor 76.

Referring to FIGURE 3, a clutch member 220 is provided for disengaging the drive of the rear conveyors 76. The clutch device 220 comprises a rigid structure 222 pivotally connected at 224. A lever means 226 pivotally connected at its inner end 228 to the structure 222 permits the friction pulley 228 to be moved from the full-line position of FIGURE 3 to the dotted-line position therein, to loosen the belt drive 200 and thereby disengage and stop the operation of the conveyors 76 while the other component parts and conveyors and brush means are in full operation. This permits the potatoes to be continuously stacked and loaded onto transverse conveyors 76, while the filled container 90 is being replaced with another container for filling.

Thus the present invention provides a self-propelled or drawn type potato harvester which provides in-line conveyor means for continuously moving the potatoes rearwardly of the machine and brush means for simultaneously cleaning and separating the potatoes from the stones; and in which the soil falls back to the earth. The vine-stripping roller means remove the vines from the potatoes where the potatoes and stones are deposited on a central conveyor and carried to the brush separators. Discharge loading conveyor means are disposed transversely of the machine and can be disengaged so as to continuously load the potatoes thereon while a full barrel or container of potatoes is being removed from the machine. In accordance with an alternative embodiment, the undulating means may be provided for shaking or vibrating the conveyors to enhance the separation of the potatoes from the stones, and the machine may also be provided with a series of pairs of brush means that can be rotated at different speeds for enhancing the separation of different size potatoes from the stones.

Although a preferred embodiment of the invention has been described in detail, it is not intended to limit the scope of the invention thereby. Numerous changes may be made in the above-described construction and different embodiments of the invention may be made without departing from the spirit and scope thereof, and the invention is to be limited only by the scope of the following claims.

What is claimed is:

1. A self-propelled vehicle for harvesting potatoes and the like from the earth comprising a frame, front and rear wheels secured to said frame; motive means for propelling said vehicle; means for steering said vehicle including means for turning said rear wheels to provide a short turn radius for said vehicle, digger means carried by said frame for plowing into the earth to dig potatoes, first longitudinal conveyor means on said frame disposed behind said digger means for receiving potatoes, stones and other material thereon, vine stripping means disposed behind said first conveyor means for stripping vines therefrom, second longitudinal conveyor means on said frame disposed rearwardly of said vine-stripping means for receiving potatoes, stones and other material from said first conveyor means after they have passed said vine-stripping means, brush means associated with said second conveyor means for separating potatoes from said stones and other material, third longitudinal conveyor means on said frame disposed adjacent said second conveyor means for receiving potatoes thereon separated by said brush means said first, second, and third conveyor means being disposed in an in-line arrangement; and drive means for rotating said first, second, and third conveyor means, and said brush means, in the same direction and opposite the direction of travel of said vehicle, whereby said potatoes are dug, stripped from any vines and separated from any stones in a substantially straight in-line operation.

2. The vehicle of claim 1 wherein said first and second conveyor means are inclined upwardly from a point adjacent their front ends, and the rear end of said first conveyor means extends beyond the front end of said second conveyor means, and said vine stripping means are disposed below said rear end of said first conveyor means and above the front end of said second conveyor means.

3. The vehicle of claim 1 wherein said first conveyor means consists of two separate and parallel disposed conveyors.

4. The vehicle of claim 3 wherein said second conveyor means consists of two separate and parallel disposed conveyors.

5. The vehicle of claim 4 wherein said third conveyor means consist of two spaced parallel conveyors disposed on opposite sides of said second conveyors and in the same plane as said third conveyors.

6. The vehicle of claim 5 wherein said receiving, storing and discharging means comprises two transverse conveyors disposed at a lower height than said third conveyors.

7. A self-propelled potato digger apparatus comprising a frame, an engine and front and rear wheels secured to said frame, potato digger means secured to the front end of said frame, means for steering said apparatus including means for turning the rear wheels thereof to provide a short turn radius of said apparatus relative to said digger means, a first pair of parallel and upwardly inclined longitudinal conveyors secured to said frame adjacent the rear side of said digger means to receive potatoes and stones thereon, a vine stripper means disposed adjacent the rear of said first conveyors to strip vines from potatoes passing thereby, a second pair of upwardly inclined longitudinal and parallel conveyors disposed in substantially straight line arrangement behind said first pair of conveyors to receive potatoes and stones therefrom, said first and second pairs of conveyors being disposed in alignment with the path of travel of said vehicle, a third pair of longitudinal conveyors with one each of said pair being disposed on the opposite outer sides of said second pair of conveyors, and in alignment with the direction of travel of said digger, rotatable brush means supported above second pair of conveyors and angularly disposed relative to said second pair of conveyors to sweep potatoes outwardly onto said third pair of conveyors, means on said second pair of conveyors to permit stones to pass under said brush means when said brush means are rotated in the same direction as said second pair of conveyors and pass stones under said brush means, said third pair of conveyors being disposed in substantially the same plane as said second pair of conveyors, drive means for rotating said first, second and third pairs of conveyors and said brush means in the same direction and opposite the direction of travel of the said apparatus, means adjacent said third pair of conveyors for continuously receiving, storing and discharging potatoes from said third pair of conveyors, and means for loading potatoes discharged from said receiving, storing and discharging means into a container.

8. The apparatus of claim 7 wherein all said conveyors comprise an endless conveyor of transverse spaced links carried on sprocket members.

9. The apparatus of claim 7 wherein said brush means extend transversely of said second pair of conveyors, and have the inner portion of said brush means being disposed forwardly of the outer portion.

10. The apparatus of claim 7 wherein said brush means consist of at least one rotatable brush, per conveyor, and said brushes are laterally offset from each other.

11. The apparatus of claim 7 wherein said brush means consist of at least two brushes per conveyor disposed in offset pairs.

12. Apparatus as defined in claim 11 wherein said brushes are supported at different heights above each of said second pair of conveyors, said forward brushes being higher relative to said second pair of conveyors than the next succeeding brush preceding toward the rear of said digger whereby potatoes of selective size are swept by said respective brushes from said second pair of conveyors as determined by the respective height of said brushes relative to said second pair of conveyors.

13. The apparatus of claim 7 wherein said vine stripping means comprises a pair of rollers with a plurality of arcuate flexible arms extending thereover.

14. The apparatus of claim 13 wherein one roller has a larger diameter than the other roller and said arms are inclined rearwardly and downwardly adjacent said large diameter roller and forwardly adjacent said smaller roller.

15. The apparatus of claim 7 wherein said rear wheel turning means comprise hydraulic rams.

16. The apparatus of claim 7 wherein said second pair of conveyors are provided with means to cause an undulating motion adjacent said brush means.

17. The apparatus of claim 16 wherein said means causing undulating motion comprise eccentric rollers.

References Cited by the Examiner

UNITED STATES PATENTS

| | | | |
|---|---|---|---|
| 2,277,450 | 3/42 | Parr | 130—30 |
| 2,365,077 | 12/44 | Hertzler et al. | 130—30 |
| 2,657,798 | 11/53 | Young | 130—30 |
| 2,717,077 | 9/55 | Leighton et al. | 130—30 |
| 2,783,849 | 3/57 | Armington et al. | 280—91 |
| 2,861,686 | 11/58 | Johnson | 171—28 X |
| 2,901,048 | 8/59 | Krukowski | 171—28 |
| 3,034,585 | 5/62 | Rainville et al. | 171—28 |

FOREIGN PATENTS 136,870   8/52   Sweden.

ANTONIO F. GUIDA, *Acting Primary Examiner.*

T. GRAHAM CRAVER, *Examiner.*